March 4, 1958 L. V. GUEST 2,825,570

SOUND REPRODUCING APPARATUS

Filed Sept. 13, 1956 4 Sheets-Sheet 1

INVENTOR
Lawrence V. Guest
BY
Ralph B. Stewart
ATTORNEY

March 4, 1958 L. V. GUEST 2,825,570

SOUND REPRODUCING APPARATUS

Filed Sept. 13, 1956 4 Sheets-Sheet 2

INVENTOR
Laurence V. Guest
BY
Ralph B. Stewart
ATTORNEY

INVENTOR
Laurence V. Guest
BY
Ralph B. Stewart
ATTORNEY

March 4, 1958 L. V. GUEST 2,825,570
SOUND REPRODUCING APPARATUS
Filed Sept. 13, 1956 4 Sheets-Sheet 4

INVENTOR
Lawrence V. Guest
BY
Ralph B. Stewart
ATTORNEY

United States Patent Office 2,825,570

Patented Mar. 4, 1958

2,825,570

SOUND REPRODUCING APPARATUS

Lawrence Vincent Guest, Old Hill, England

Application September 13, 1956, Serial No. 609,608

6 Claims. (Cl. 274—10)

The present invention relates to apparatus for use in the reproduction of sound from a succession of disc records of various sizes fed singly in succession on to a turntable by downward movement from the lower end of a stack carried on a spindle extending upwards from the centre of the turntable, and to automatically operated apparatus of this kind wherein the extent of the inward movement imparted to the reproducer in the general direction parallel to the plane of the turntable, as a preliminary to the lowering of the stylus into engagement with the record to be played, is made to correspond with the size of that record, by mechanism adapted to function to temporarily stop the inwardly moving reproducer, operation of said mechanism being determined by the engagement or non-engagement therewith of the edge of that record as it moves from the lower end of the stack to the playing position on the turntable.

The invention relates in particular to apparatus of the kind wherein the means determining the extent of the inward movement imparted to the reproducer consists of a fixed support and settable means in the form of an arresting device extending above and below the level of the turntable and mounted for movement into alternative positions relative to the fixed support, the said arresting device being biased in one direction and the position thereof being determined by a movable detent located adjacent the upper end of the arresting device and having a blade adapted to extend into the path of movement of records of above a given size falling from the stack to the playing position and such that the detent is moved by a falling record of above a given size, the lower end of the arresting device being arranged for engagement by a part movable with the reproducer arm as the latter makes its inward movement as a preliminary to reproduction of a record, so as to arrest the inward movement of said part and the reproducer arm at one or other of a number of different points according to the set position of the arresting device, at which point the stylus of the reproducer is poised over the edge of the previously fallen record now in the playing position. An apparatus of this kind is described in the specification of my co-pending application Serial No. 270,916, which became Patent No. 2,794,646 on June 4, 1957.

It is an object of the present invention to provide an improved form of apparatus of the kind described above presenting the advantages of simplicity, compactness and economy in production, with complete reliability in use.

The improved apparatus according to the present invention may be readily constructed in a form for use in the reproduction of disc records from a stack of two sizes of records only but it may also be readily constructed to deal with stacks of three and even more different sizes of records mixed in any order.

In accordance with the present invention sound reproducing apparatus of the kind indicated above is provided having means for locating the reproducer comprising a fixed support, an arresting device extending above and below the level of the turntable and mounted for rocking movement about a pivot on the fixed support, and biased in one direction about said pivot, a pivoted detent located adjacent the upper end of said arresting device movable in a plane approximately normal to the plane of movement of the arresting device, said detent including a blade adapted to extend into the path of movement of records above a given size falling from the stack to the playing position and said detent having at least one surface arranged for engagement by the upper end of the arresting device such as to retain said arresting device in one position about its pivot, and for displacement from such engagement when the blade of the detent is contacted by a falling record and the detent moved, to permit the arresting device to rock about its pivot under its bias to an alternative position, a part movable together with the reproducer from an outer position inwards as a preliminary to engagement of the stylus with the record to be played and adapted to make abutting engagement with the lower end of said arresting device to temporarily interrupt said inward movement at one or other of a number of different points as determined by the position of said lower end of said arresting device and corresponding to the size of the last fallen record now in the playing position, and means for resetting the arresting device against its bias about its pivot.

Embodiments of the invention are illustrated in the accompanying drawing by way of examples as applied to an apparatus capable of reproducing records from a stack including records of three different sizes, it being understood that the same apparatus will deal effectively with stacks of records of one or of two of those sizes only.

Figures 3, 4, 6, 8:
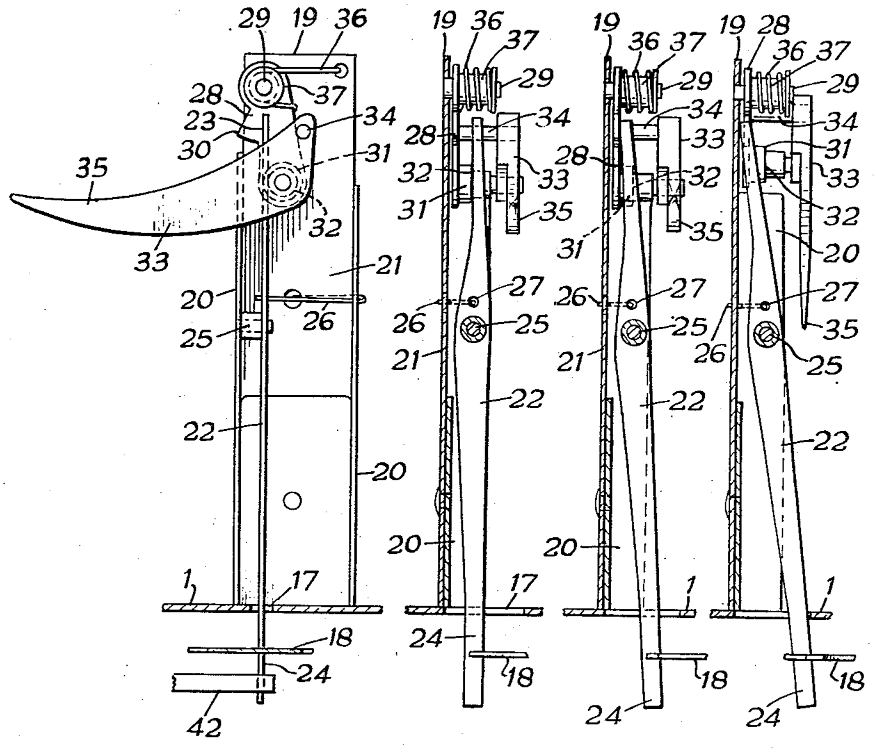
Figs. 3 and 4 are diagrammatic views in side and front elevation respectively showing one position of the arresting means of Fig. 2.
Figure 5:
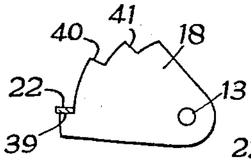
Fig. 5 is a diagrammatic sectional plan view showing the lower end of the parts in Figs. 3 and 4.
Figure 7:
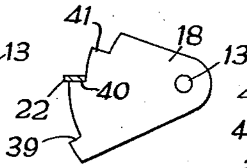
Figure 9:
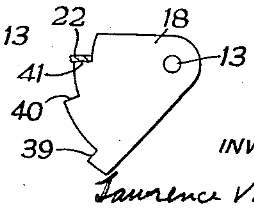

Figs. 6 and 7 are views corresponding to Figs. 4 and 5 but showing parts in a second position, and Figs. 8 and 9 are further views corresponding to Figs. 4 and 5 but showing parts in a third position.

Figure 10:
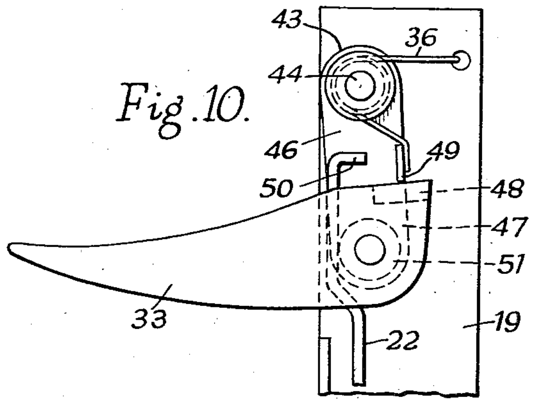
Figure 11:
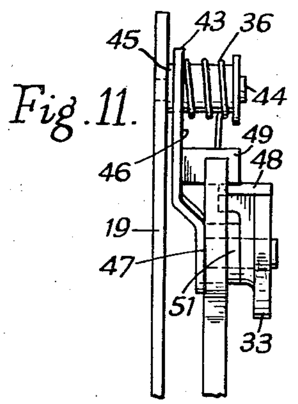

Figs. 10 and 11 are views in side and front elevation of a modified form of the upper end of the improved arresting means.

Figure 12:
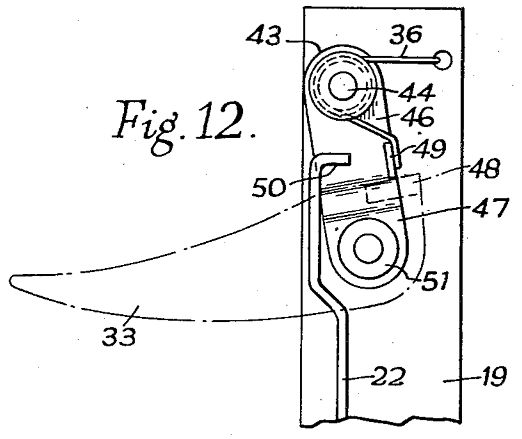
Figure 13:
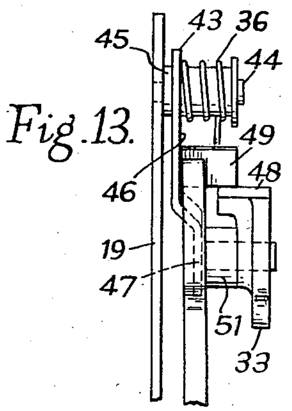
Figure 14:
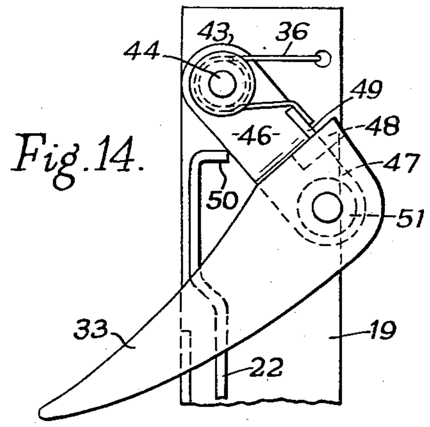
Figure 15:
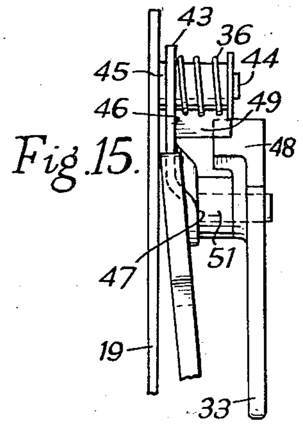

Figs. 12 and 13 are views corresponding to Figs. 10 and 11 showing the parts in alternative positions and Figs. 14 and 15 are further views corresponding to Figs. 10 and 11 showing the parts in a third position.

Referring to the drawings the machine illustrated comprises a motor board 1 supporting on its underside a driving motor of any convenient form (not shown) for driving a conventional turntable 2. A pick-up arm 3 carrying a pick-up 4 at its free end is mounted at its rear end 5 (Fig. 1) for movement about a vertical pivot to permit movement of the pick-up 4 transversely of the turntable, and also about a horizontal pivot for vertical movement to permit the pick-up 4 to be raised and lowered relative to the turntable 2 all in well known manner.

A stationary spindle 7 extends upwards from the centre of the turntable 2, said spindle being of any well known from capable of supporting a stack of superposed disc records 8 with their central apertures axially aligned, and including known automatically operated means (not shown) for releasing said records singly in succession from the lower end of the stack to slide down the spindle 7 into the playing position on the turntable 2.

The machine also includes automatic mechanism of known form (not shown) adapted on completion of the reproduction of a record, to be driven by the motor and to execute a cycle of operations consisting in raising the pick-up arm 3 to disengage the pick-up from the played record, thereafter swinging the pick-up arm 3 outwards to a position outside the path of the largest record sliding down the spindle 7, releasing the lowest record from the stack 8 to permit it to fall on to the turntable 2 or on to previously played records thereon, swinging the raised pick-up arm 3 inwards to a position over the edge of the record now to be played and lowering the pick-up into engagement with the record now to be played.

Figure 2:
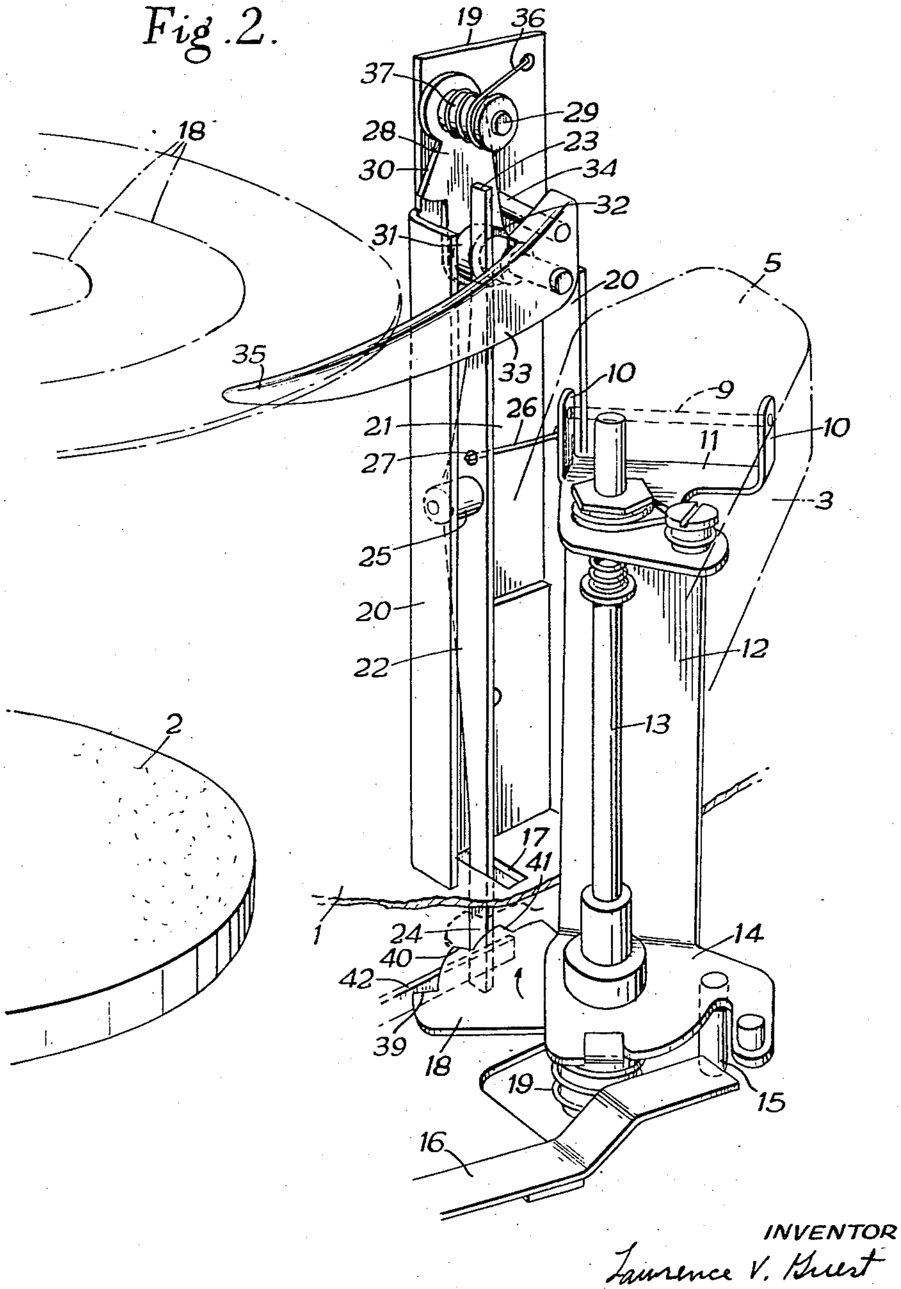
Fig. 2 is a separate view in perspective of one form of the improved locating means for the reproducer or pick-up.

As shown in Fig. 2 the pick-up arm 3, a part of which is indicated by dotted lines, is mounted for up and down movement of the pick-up carrying end thereof about a horizontal axis spindle 9 carried by lugs 10 formed on a plate 11 at the upper end of a bracket 12 rotatable about the axis of a spindle 13. The bracket 12 includes a bottom plate 14 supporting a depending pin 15 which is engaged, during an early part of a cycle of automatic operations and after the pick-up arm 3 has been raised in the manner described in my co-pending application Serial No. 270,916 to disengage the stylus of the pick-up from a played record, by a reciprocating part 16 of the automatic mechanism whereby the bracket 12 and the reproducer arm 3 are moved counterclockwise about the axis of the spindle 13 in Fig. 2, that is to say outwards of the turntable 2 to a position outside the path of a record of any size falling from the stack 8 down into the playing position.

A member 18 hereinafter termed a quadrant, is mounted below the bottom plate 14 of the bracket 12 also for movement about the axis of the spindle 13 and this quadrant is arranged to be clutched to the plate 14 of the bracket 12 at a point in such counterclockwise movement in the manner described in the specification of my co-pending application Serial No. 270,916 so as to take part thereafter in such movement. This movement of the quadrant 18 is utilised to load a return spring 19 whereby the quandrant 18, and the parts clutched thereto comprising the bracket 12 including the plates 11 and 14, and the reproducer arm 3 are swung clockwise or towards the turntable 2 when freed to move upon retraction of the reciprocating part 16 of the automatic mechanism.

The quadrant 18, constitutes the above-mentioned "part movable with the reproducer arm" and the clockwise or inward swinging movement of the quadrant 18 and the above described parts clutched thereto continues until the quadrant is brought to a standstill by engagement with an arresting member, the position of which has been determined in accordance with the size of a record previously dropped from the stack 8 to the playing position during the same cycle of automatic operations, in which position of standstill the stylus of the pick-up 4 on the arm 3 is poised over the edge of the record now in the playing position.

Thereafter the pick-up arm and pick-up are lowered to engage the stylus with the record and the quadrant 18 is unclutched from the plate of the bracket 12 carrying the pick-up arm and the pick-up arm thus freed for the unimpeded traversing of the record for reproduction, all as fully described in the specification of my co-pending application Serial No. 270,916.

The means according to the present invention for determining the point at which the return movement of the quadrant 18 and therefore of the inward swinging movement of the reproducer arm 3 is interrupted, is as follows:

A fixed support is provided in the form of a vertical flat post 19 having a pair of vertical edge flanges 20 extending at right angles to the main body part 21 of the post 19. A bar 22 extending in a general vertical direction and disposed with its upper end 23 above the turntable 2 and with its lower end 24 extending through a slot 17 in the motor board 1 below the level of the turntable 2, is pivoted at a point 25 intermediate its ends 23 and 24 to one of the edge flanges 20 on the fixed flat post 19 so as to be capable of limited rocking movements about the pivot 25 in a plane at right angles to the face of the flat post 19. The bar 22 constitutes the above mentioned arresting device.

A light spring 26 anchored to the flat post 19 engages in a hole 27 in the bar 22 in such a manner as to urge the upper end 23 of the bar towards the face of the upper end of the flat post 19.

At the upper end of the flat post 19 is mounted a detent member in the form of a flat plate 28 movable about a fixed pivot 29 and in a plane parallel to and spaced from the face of the flat post 19.

At the lower end of the plate 28 and spaced from the outer side edge 30 thereof is fixedly mounted a two-diameter stud 31 the larger diameter part of which is adjacent the plate 28 so that a shoulder 32 is presented facing away from the plate 28.

The free end of the stud 31 is further reduced and on that free end is pivotally mounted an elongated finger or blade 33 in a plane parallel to the plate 28 and having a laterally extending pin 34 arranged to engage an edge of the plate 28 in such a manner as to limit the rotation of the blade 33 by gravity in one direction about the axis of the stud 31.

The blade 33 extends away from the fixed post 19 in a direction parallel to the face thereof and with its free end 35 directed towards the record supporting spindle 7 and below the level of a stack of records such as 8 supported on said spindle.

A light spring 36, anchored at one end to the flat post 19 encircles a sleeve 37 on the pivot 29 and fixed to the pivoted plate 28 so as to be rotatable with the plate about the pivot 29, and engages with the plate 28 in such a manner as to urge the plate with light pressure in one direction about the pivot 29, clockwise in Figs. 2 and 3.

The free end of the quadrant 18 below the motor board 1 is of stepped formation so as to present three spaced edge surfaces 39, 40, 41, extending approximately radially from the axis of the spindle 13 and at successively decreasing radial distances from that axis such that one or other of these three edge surfaces can make engagement with the lower end 24 of the bar 22 when the return movement of the quadrant 18 is executed under the urge of the return spring 19, and as determined by the position occupied by the lower end 24 of the bar 22.

The normal position of the bar 22 is that shown in Figs. 3 and 4 in which the upper end 23 of the bar rests under the light pressure of the spring 26, with an edge of the bar against the shoulder 32 on the two-diameter stud 31 carried by the flat detent plate 28, and means are provided for resetting the bar 22, when necessary, to this normal position during each cycle of automatic operations and before the release of a record during that same cycle from the stack 8 to the playing position.

In the case illustrated in Fig. 2, the resetting means consists of a lever 42 which is rocked momentarily and automatically into engagement with the lower end 24 of the bar 22 to move the latter about its pivot 25 against the spring 26 and clockwise from the position shown in Fig. 6 or Fig. 8 and into the position shown in Fig. 4.

The operation of the apparatus is as follows:

With a stack 8 of disc records of three different sizes 7", 10" and 12" diameter carried on the spindle 7 above the turntable 2 and a record on the turntable being played, the pivoted arresting bar 22 will be in any one of the three alternative positions shown in Figs. 4, 6 and 8, according to the size of the record last fed from the stack and now being played, and being retained in that position by the light spring 26.

When playing of the record in the playing position is completed the automatic mechanism driven by the motor is put into operation in any well known manner to carry out the cycle of automatic operations.

Figure 1:
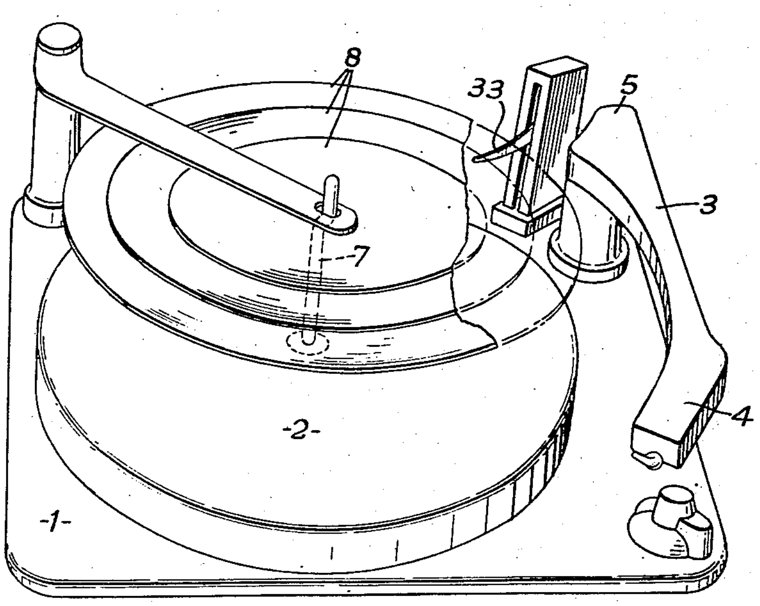
Fig. 1 is a general perspective view of a sound reproducing apparatus embodying the invention.

The pick-up arm 3 is raised to disengage the stylus from the played record and the reciprocating part 16 engages the pin 15 to rotate the bracket 12 about the axis of the spindle 13 to swing the pick-up arm outwards to a position such as is shown in Fig. 1 in which it is outside the path of a record of any size which may pass from the lower end of the stack down along the spindle 7 to the playing position, and during the early part of this rotation of the bracket 12 the quadrant 18 is clutched to the bottom plate 14 of the bracket 12 all in the manner described in my co-pending application Serial No. 270,916, so that the quadrant thereafter moves in unison with the pick-up arm about the axis of spindle 13 and the return spring 19 is loaded.

During this outward swinging movement of the pick-up arm 3 the resetting lever 42 is also rocked so that the bar 22, if not already in the normal position shown in Figs. 2 and 3, is rocked about its pivot 25 against the light spring 26 in the direction in which its upper end moves away from the face of the fixed post 19 and the detent plate 28, in unison with its blade 33, is permitted to move about its pivot 29 under the urge of the spring 36 until the small diameter part of the stud 31 on the detent plate contacts the side surface of the upper end 23 of the bar 22, in which position the shoulder 32 on the stud 31 is presented to the edge of the upper end 23 of the bar 22 to retain the bar in the normal position.

In this normal position of the bar 22 and the detent plate 28 the blade 33 projects towards the record supporting spindle 7 and below the stack of records thereon with its free end 35 in a position for engagement by records of any but the smallest size moving down the spindle 7 into the playing position.

The pick-up arm 3 having reached its outwardly swung position the lowermost record of the stack 8 is now released by the automatic mechanism in known manner to slide down the spindle 7 into the playing position.

If the falling record is a 7″ record no contact will be made between the record and the finger or blade 33 of the detent 28 so that the bar 22 will remain unmoved from the normal position, i. e. the position shown in Figs. 2, 3 and 4.

If however the falling record is of the intermediate size i. e. a 10″ record the finger or blade 33 is engaged by the record and rocked together with the detent plate 28 about the pivot 29 on the fixed post 19 and against the light spring 36, to an extent to disengage the shoulder 32 on the stud 31 carried by the detent plate 28 from the edge of the upper end 23 of the bar 22 and to present the face of the plate 28 itself to said upper end. Thus the bar 22 is permitted to rock under the urge of the spring 26 to an intermediate position as shown in Fig. 7, return of the detent plate 28 being prevented by engagement of the large-diameter part of the stud 31 with the side of the upper end 23 of the bar 22.

If the falling record is of the largest size i. e. a 12″ record, the finger or blade 33 is engaged and rocked together with the detent plate 28 about the pivot 29 and against the spring 36 but to an extent such that the edge 30 of the plate 28 is moved entirely across and out from engagement with the upper end 23 of the bar 22. Thus the bar is permitted to take a position under the urge of the light spring 26 in which the upper end 23 of the bar engages the face of the fixed post 19, this position being shown in Fig. 8.

According to that one of the three alternative positions about the pivot 25, occupied by the bar 22, the lower end 24 of the bar 22 extending across the plane of movement of the quadrant 18, will be located in the path of movement of a corresponding one of the three edge surfaces 39, 40 and 41 on the quadrant 18.

The record to be played now being in the playing position, the reciprocating member 16 is retracted and the quadrant 18 and the pick-up arm 3 clutched thereto are moved in unison about the axis of the spindle 13 by the return spring 19 in the direction to swing the pick-up arm 3 inwards.

If the dropped record is a 7″ record the bar 22 will be in the position shown in Figs. 3 and 4 and the inward swinging movement will continue until the edge surface 39 on the quadrant furthest from the axis of the spindle 13 engages the lower end of the bar 22 as shown in Fig. 5 so that the quadrant 18 and the pick-up arm are brought to a standstill in a position in which the pick-up 4 is poised with its stylus over the starting edge of the previously dropped 7″ record now in the playing position.

If the dropped record is a 10″ record so that the bar 22 is in the intermediate position shown in Fig. 6, the arrest of the quadrant 18 and the pick-up arm 3 will occur when the intermediate edge surface 40 on the quadrant 18 meets the lower end of the bar 22 as shown in Fig. 7, and the pick-up in this position will be poised over the edge of the 10″ record, or if the dropped record is a 12″ record, the bar 22 will be in the third position shown in Fig. 8 and arrest of the quadrant 18 and the pick-up arm 3 will occur when the third edge surface 41 nearest the spindle 13 meets the lower end of the bar 22.

The pick-up arm 3 is now lowered to engage the stylus with the record and the quadrant 18 unclutched from the bracket 12 carrying the pick-up arm 3 all in the manner described in my co-pending application Serial No. 270,916 so that the pick-up arm 3 is released for the free swinging movement necessary to permit the stylus to track in the sound groove of the record in the usual manner.

In the alternative construction shown in Figs. 10 to 15 the detent at the upper end of the flat post 19 is formed by an elongated metal plate 43 pivoted at its upper end to the flat post 19 as shown at 44 with the interposition of a washer 45 spacing the plate from the flat post and cranked so as to present two surfaces 46 and 47 parallel to the face of the flat post 19 and spaced from one another, and a spring 36 is provided as in the previously described construction, tending to urge the detent plate 43 clockwise as shown, about its pivot 44.

The record sensing finger or blade 33 is pivotally mounted on the lower end of the plate 43, being spaced from the plate 43 by a spacing member 51 and the normal position of the blade about its pivot and relative to the plate is determined by gravity and the engagement of a projection 48 on the rear end of the blade 33 with a stop projection 49 on the plate 43.

The arresting device formed by the bar 22 is mounted as in the previously described construction to move about a pivot (not shown) and in a plane at right angles to the face of the flat post 19, and the upper end of the bar is bent to provide a laterally extending end piece 50 as shown in Figs. 10, 12 and 14.

The normal position of the parts is shown in Figs. 10 and 11 in which the position of the bar 22 about its pivot is determined by the engagement of a part of an edge of the bar spaced from the end piece 50, with the surface 47 of the cranked plate 43 farthest from the flat post 19, and the position taken by the cranked pivoted plate 43 about its pivot 44 under the urge of spring 36 is determined by the engagement of the spacing member 51 with a side surface of the bar 22.

This position of the bar 22 is appropriate for the lower end thereof to arrest the quadrant and the pick-up in the correct position for commencement of playing of a record of the smallest or 7″ size in the manner previously described.

If a record of intermediate size e. g. 10″ diameter is dropped from the stack, the blade 33 is contacted and moved counter-clockwise with the cranked plate 43 about the pivot 44 and to an extent such that the lower surface 47 of the plate 44 moves from engagement with the bar 22, so that the bar is permitted to move about its pivot under the urge of its biasing spring until the laterally extending end piece 50 at the upper extremity of the bar meets the face 46 of the plate 43 nearest the flat post 19. Return of the blade 33 and the plate 43 is prevented by the engagement of the side surface of the bar 22 with the side of the shoulder at the junction of the two surfaces 46 and 47 of the plate 44.

This position is shown in Figs. 12 and 13 and the lower end of the bar is here located appropriately for arresting engagement as previously described, by the quadrant to locate the pick-up in the correct position for commencement of playing of a record of the intermediate size.

If the falling record is of the largest size i. e. 12" diameter the blade 33 and plate 43 are rocked in unison as before about pivot 44 but to an extent to remove the upper surface 46 from engagement with the lateral end extension 50 so that the bar 22 is permitted to move to a third position determined by engagement of the lateral end extension 50 with the surface of the flat post 19. Return of the blade 33 and the plate 44 is prevented by engagement of the edge of the surface 46 of the plate 44 with the end of the lateral end extension 50 on the end of the bar.

This third position is shown in Figs. 14 and 15 and the lower end of the bar is here located appropriately for arresting engagement by the quadrant to locate the pick-up in the correct position for commencement of playing of a record of the largest size.

Resetting of the bar 22 may be effected in the manner previously described the detent plate 43 together with its blade 33 making a return movement through its spring 36 until the spacing member 51 again contacts the side of the bar 22 near the upper end thereof and the lower surface 47 on the plate 43 is interposed behind the bar in the manner shown in Figs. 10 and 11.

The use of the lateral end extension 50 offers the advantage of latitude in ensuring that the mechanism will be correctly set by a record of the intermediate or 10" diameter size, that is to say that the mechanism will always be moved from the normal to the second position when a 10" record falls and will never be moved accidentally to the third position by a 10" record despite the variations in size and weight met with in commercial records.

The improved arrangement according to the invention offers the advantage that extremely light biasing springs may be used for the bar constituting the arresting device for the detent plate, and the resistance to sliding movement of the detent across the upper end of the lightly biased bar can be kept very small so that a minimum of work is called for on the part of a falling record in moving the detent thus ensuring certainty of operation even with records of the lightest weight.

Pivotal mounting of the finger or blade 33 on the detent plate enables the blade to be moved from the path of played records being lifted from the playing position and off the record supporting spindle 7.

I claim:

1. In sound reproducing apparatus of the kind indicated, means for locating the reproducer over the edge of a record to be played, comprising a fixed support, an arresting device extending above and below the level of the turntable and mounted for rocking movement about a pivot intermediate its ends on the fixed support, and biased in one direction about said pivot, a pivoted detent located adjacent the upper end of said arresting device and movable in a plane approximately normal to the plane of movement of the arresting device, said detent including a blade adapted to extend into the path of movement of records above a given size falling from the stack to the playing position and said detent having at least one surface arranged for engagement by the upper end of the arresting device such as to retain said arresting device in one position about its pivot, and for displacement from such engagement when the blade of the detent is contacted by a falling record and the detent moved, to permit the arresting device to rock about its pivot under its bias to an alternative position, a part movable together with the reproducer from an outer position inwards as a preliminary to engagement of the stylus with the record to be played and adapted to make abutting engagement with the lower end of said arresting device to temporarily interrupt said inward movement at one or other of a number of different points as determined by the position of the lower end of said arresting device and corresponding to the size of the last fallen record now in the playing position, and means for resetting the arresting device against its bias about its pivot.

2. Sound reproducing apparatus having the features claimed in claim 1 wherein the detent movable by a falling record includes a flat plate movable about a fixed pivot on the fixed support and with one face capable of sliding engagement with the upper end of the arresting device the arrangement being such that in one position of said flat plate corresponding to one size of record the arresting device is located by engagement of the upper end of the arresting device with said face of the flat plate and engagement of a falling record of larger than said one size with the blade of the detent causes the said face of the flat plate to slide across and beyond the upper end of the arresting device to free the arresting device for movement to an alternative position under its bias.

3. Sound reproducing apparatus having the features claimed in claim 1 wherein the pivoted detent includes a flat plate movable in a plane approximately normal to the plane of movement of the arresting device and for engagement by the upper end of the arresting device in one position of the detent to retain the arresting device in one position about its pivot and a part projecting from and movable with said flat plate and presenting a surface spaced from said flat plate for engagement by the upper end of the arresting device in another position of the detent to retain the arresting device in another position about its pivot.

4. Sound reproducing apparatus having the features claimed in claim 1 wherein the detent includes a pivoted plate cranked to present a plurality of surfaces spaced from one another and substantially parallel to a face of the fixed support, and the arresting device is in the form of a bar pivoted intermediate its ends and biased in the direction to move its upper end towards the said face of the fixed support, the arrangement being such that the bar may engage with its upper end any one of the surfaces of the cranked plate according to the position of the said plate about its pivot, to locate the bar in a required arresting position.

5. Sound reproducing apparatus having the features claimed in claim 4 for use with three sizes of records, and wherein the cranked plate presents two surfaces for engagement by the upper end of the bar and moves in a plane spaced from the face of the fixed support so that a further arresting position of the bar is determined by engagement of the upper end of the bar with the face of the fixed support when the plate is moved about its pivot to an extent to remove both its surfaces from the path of the upper end of the bar.

6. Sound reproducing apparatus as claimed in claim 5 wherein the bar is provided at its upper end with a lateral extension for engagement with that surface of the cranked plate nearest the fixed support in an intermediate position of the plate and the bar.

No references cited.

Attesting Officer

Commissioner of Patents

U. S. DEPARTMENT OF COMMERCE

PATENT OFFICE

CERTIFICATE OF CORRECTION

Patent No. 2,825,570 Lawrence Vincent Guest March 4, 1958

It is hereby certified that error appears in the printed specification of the above numbered patent requiring correction and that the said Letters Patent should read as corrected below.

Column 1, line 57, for the patent number "2,794,646" read

-- 2,794,647 --.

Signed and sealed this 8th day of July 1958.

(SEAL)
Attest:

KARL H. AXLINE
Attesting Officer

ROBERT C. WATSON
Commissioner of Patents